United States Patent
Takata et al.

(10) Patent No.: US 8,268,440 B2
(45) Date of Patent: Sep. 18, 2012

(54) STEEL PLATE-REINFORCING MATERIAL OF A TYPE GIVING VIBRATION-DAMPING PERFORMANCE TO A STEEL PLATE

(75) Inventors: Ayumi Takata, Toyota (JP); Yasuhiko Ohashi, Toyota (JP); Kunitoshi Nakamoto, Chiryu (JP)

(73) Assignees: Nihon Tokushu Toryo Co., Ltd., Tokyo (JP); Toyota Jidosha Kabushiki Kaisha, Toyota-shi (JP)

( * ) Notice: Subject to any disclaimer, the term of this patent is extended or adjusted under 35 U.S.C. 154(b) by 566 days.

(21) Appl. No.: 12/375,326

(22) PCT Filed: Jul. 18, 2007

(86) PCT No.: PCT/JP2007/064149
§ 371 (c)(1),
(2), (4) Date: Sep. 22, 2009

(87) PCT Pub. No.: WO2008/020522
PCT Pub. Date: Feb. 21, 2008

(65) Prior Publication Data
US 2010/0048749 A1   Feb. 25, 2010

(30) Foreign Application Priority Data
Jul. 27, 2006   (JP) .................................. 2006-204224

(51) Int. Cl.
*B32B 7/12*   (2006.01)
*B32B 3/26*   (2006.01)
(52) U.S. Cl. ............... 428/317.5; 428/319.1; 428/319.3; 428/319.7; 428/343; 428/317.9
(58) Field of Classification Search ............... 428/319.1, 428/319.3, 319.7, 343, 317.5, 317.9
See application file for complete search history.

(56) References Cited

U.S. PATENT DOCUMENTS

| | | | |
|---|---|---|---|
| 4,734,323 A * | 3/1988 | Sato et al. ................. | 428/317.3 |
| 2001/0044503 A1* | 11/2001 | Born et al. ................. | 525/332.5 |
| 2005/0032447 A1* | 2/2005 | Tachibana et al. ............ | 442/149 |

FOREIGN PATENT DOCUMENTS

| | | |
|---|---|---|
| JP | 62-275743 A | 11/1987 |
| JP | 06-170997 A | 6/1994 |
| JP | 07-068696 A | 3/1995 |
| JP | 08-035538 A | 2/1996 |
| JP | 09-226061 A | 9/1997 |
| JP | 10-076586 A | 3/1998 |
| JP | 11-49896 A | 2/1999 |
| JP | 2002-80660 A | 3/2002 |
| JP | 2005-186303 A | 7/2005 |

OTHER PUBLICATIONS

Translation of JP 2005-186303, Uwano et al., Jul. 14, 2005.*
International Search Report of PCT/JP2007/064149, date of mailing Dec. 25, 2007.
"Noise Cure Handbook" Acoustical Materials Associates of Japan Publication, p. 438. Cited in EP Search Report.

* cited by examiner

*Primary Examiner* — Hai Vo
(74) *Attorney, Agent, or Firm* — Westerman, Hattori, Daniels & Adrian, LLP

(57) ABSTRACT

A steel plate-reinforcing material of a type giving vibration-damping performance to a steel plate including a restricted layer and a thermosetting foamed viscoelasticity layer, as tackifiers included in said thermosetting foamed viscoelasticity layer, the tackifiers including a terpene system resin, an aliphatic series system petroleum resin and an aromatic series system petroleum resin are used, a fiber is added to the thermosetting foamed viscoelasticity layer.

5 Claims, 2 Drawing Sheets

STEEL PLATE-REINFORCING MATERIAL OF A TYPE GIVING VIBRATION-DAMPING PERFORMANCE TO A STEEL PLATE

TECHNICAL FIELD

The present invention relates to the steel plate-reinforcing material of the type giving vibration-damping performance to the steel plate. More particularly, the present invention relates to thereof which may be structured in a ceiling of vehicles in spite of foaming type and may be structured in both before electrodeposition and after electrodeposition when a manufacturing process of vehicles.

BACKGROUND ART

In an automobile, the thickness of thereof was showing a tendency to thin out by reduction of weight and the progress of strength of the steel plate. Therefore, from the request that the prevention of a dent of the body of the automobile, and from the request of a diminution of the noise when a door shuts, a material for reinforcement of the steel plate was stacked for said steel plate.

Examples of said material for reinforcement of the steel plate include a material which a restricted layer such as aluminum foil or a glass cloth etc. puts up a bark of thermosetting foam viscoelasticity layer manufactured by epoxy resin or a rubber etc.

Said restricted layer may be used for reasons of endowing the performance of toughness for the thermosetting foamed viscoelasticity layer.

As said material for reinforcement of the steel plate, two layers structure composed of said restricted layer and said thermosetting foam viscoelasticity layer is to be desired for reasons of price-respect etc. However, in former example, it is often necessary at least three structure, because of the need of compatibility both the performance of vibration-damping and the performance of reinforcement (Japan Unexamined Patent Publication No. Hei. 7-68696, Japan Unexamined Patent Publication No. Hei. 2005-186303, Japan Unexamined Patent Publication No. Hei. 8-35538).

Said material for reinforcement of the steel plate become as higher an effect of reinforcement as increase a degree of hardening of said thermosetting foam viscoelasticity layer, on the other hand, an effect of the diminution of the noise when the door shuts and rainy sound become lose. Also, when if a structure of the only a vibration-damping material, an effect of vibration-damping become higher, on the other hand, the effect of reinforcement become extremely low. According as kind of the automobile, there is a case that both the steel plate reinforcement sheet and the vibration-damping sheet are used for one plate of door. In this case, it is preferred to have both the function of reinforcement and the function of vibration-damping, generally, but it is extremely difficult to have both these function of reinforcement and vibration-damping.

The automobile has a vertical section and a rear section such as the door, a quarter and a roof. As above mentioned, it is necessary to stick the material for reinforcement of the steel plate on the vertical section such as the door. On the other hand, at the rear section such as the roof too, the structure of the material for reinforcement of the steel plate is carried out, for example, from the request of both said reinforcement and vibration-damping that the prevention of the dent when washing etc., the measures of rainy sound and the measures of propagation of sound to automobile-body. Said material for reinforcement of the steel plate was used the foam-type thereof, but, in order to structure against said rear section, it is necessary excellent heat resistance and adhesive strength more than structure against said vertical section such as the door.

However, said foam-type material for reinforcement of the steel plate has inconvenience by drop-out etc., in a roof-panel of the ceiling, generally, therefore, it is numerous toward to select non-foam-type thereof.

In order to stick the material for reinforcement of the steel plate on the automobile, foaming and heat-melting-adhesion by utilization of heat (energy) of a heating apparatus (heating drying oven) in coating and drying line of thereof are effective. In the automobile production line, various coating work process thereof is carried out after through the process composed of washing treatment of an antirust oil from the face of the steel plate, chemical conversion treatment and electrodeposition. Then, in order to stick the material for reinforcement of the steel plate on the back side of an outside section, it need to stick before a stage of structure of the body, it is desirable to stick before or after washing and removing-oil treatment. Therefore, generally, in the case of before-after electrodeposition, at ratio of near 100%, it carried out before electrodeposition, in the present circumstances. Whereas, in case of structure of a member such as the material for reinforcement of the steel plate on the above-mentioned ceiling, in order to try equation of the force of pressure-fixation, the structure by an automatic machine for pressure-fixation is desirable. But the establishment of said automatic machine is difficult before electrodeposition for reason of relation of space in the line of the automobile, then said establishment carries out after electrodeposition. From said request, the material for reinforcement of the steel plate of the type which may be structured also after electrodeposition was proposed partially. But, temperature-difference of structure between before electrodeposition and after electrodeposition is 30° C. or so, it is need to make a prescription of low-temperature-hardening as the material for reinforcement of the steel plate of the type which may be structured also after electrodeposition. However, in this case, said material against low temperature has trouble of storage stability when temperature was rose, when said material uses as composition elements of the material for reinforcement of the steel plate after preservation of proper period, said material has trouble of deterioration of the performance of impact resistance.

In the material for reinforcement of the steel plate, a pigment having high aspect ratio such as mica and special denatured asphalt may be added for reason of respect of cost and intensity, but the addition of said pigment having high aspect ratio such as mica and special denatured asphalt has troubles that initial baking performance is good for the rear section such as the ceiling etc., however, in the result of the test of the performance of impact resistance, when the impact from the outer side was added, the appearance of float part and peel part are occurred, it can not show fully function of reinforcement and vibration-damping, also, after preservation of proper period, said material has trouble of deterioration of the performance of impact resistance.

Patent Documents 1: Japan Unexamined Patent Publication No. Hei. 7-68696, Japan Unexamined Patent Publication No. 2005-186303, Japan Unexamined Patent Publication No. Hei. 8-35538

DISCLOSURE OF INVENTION

Problems to be Solved by the Invention

It is therefore an object of the present invention to provide technical skill to eliminate the above-mentioned problems, and to provide technical skill can be reply the above-mentioned request.

The foregoing and other objects and novel features of the present invention will become clear from the following description and the accompanying drawings.

Effects of the Invention

According to the present invention, the present invention can be provided the steel plate-reinforcing material of the type giving vibration-damping performance to the steel plate which may be replied for the request that the prevention of the dent of the body of the automobile and the diminution of the noise when the door shuts.

According to the present invention, the present invention can be provided the steel plate-reinforcing material of the type giving vibration-damping performance to the steel plate having both function of reinforcement and vibration-damping. Specially, the present invention can be provided said material structured two layers composed of the restricted layer and the thermosetting foamed viscoelasticity layer. Said material is low price for reason of two layers structure which is composed of the restricted layer and the thermosetting foamed viscoelasticity layer.

According to the present invention, the present invention can be provided the steel plate-reinforcing material of the type giving vibration-damping performance to the steel plate which may be structured not only on the vertical section such as the door, but also on the rear section such as roof, nevertheless foam-type thereof, it can be structured in said the rear section without inconvenience by drop-out etc., when structured against said rear section, it can be showed excellent heat resistance and adhesive strength. Therefore, in the roof panel of the ceiling, the steel plate-reinforcing material of the type giving vibration-damping performance to the steel plate can be replied for the request of both said reinforcement and vibration-damping that the prevention of the dent at washing etc., the measures of rainy sound and the measures of propagation of sound to automobile-body may be provided.

According to the present invention, the present invention can be provided the steel plate-reinforcing material of the type giving vibration-damping performance to a steel plate which may be structured also after electrodeposition, even when the prescription of low temperature hardening as the steel plate-reinforcing material of the type giving vibration-damping performance to the steel plate which may be structured also after electrodeposition was carried out, said material has excellent storage stability when even after preservation of proper period, said material has not trouble of deterioration of the performance of impact resistance.

According to the present invention, even when the pigment having high aspect ratio such as mica and special denatured asphalt was added, initial baking performance is good to the rear section such as the ceiling etc., if when the impact from outer side was added, the appearance of float part and peel part doesn't occurs, fully function of reinforcement and vibration-damping can be shown, also, after preservation of proper period, said material has not trouble of deterioration of the performance of impact resistance.

BEST MODE FOR CARRYING OUT THE INVENTION

In the present invention, as regards the tackifier comprised the thermosetting foamed viscoelasticity layer, said tackifiers comprising the terpene system resin, the aliphatic series system petroleum resin and the aromatic series system petroleum resin are used, the fiber (the fibrous material) is added together to the thermosetting foam viscoelasticity layer, therefore, the steel plate-reinforcing material of the type giving vibration-damping performance to the steel plate structured two layers composed of the restricted layer and the thermosetting foam viscoelasticity layer can be provided.

Said material has both function of reinforcement and vibration-damping.

Said material can be structured on the rear section such as the roof nevertheless foam-type and can be structured also after electrodeposition. Furthermore, nevertheless when the pigment having high aspect ratio such as mica and special denatured asphalt was added, the initial baking performance was good to the rear section such as the ceiling etc., when if the impact from outer side was added, the appearance of the float part and the peel part does not occur, the fully function of reinforcement and vibration-damping can be shown, also, after preservation of proper period, said material has not trouble of deterioration of the performance of impact resistance.

It is desirable that the restricted layer in the present invention is as light-weight and thinly as possible. Also, it is desirable that the restricted layer can be endowed the performance of strong for the thermosetting foam viscoelasticity layer. Further, it is desirable that the material thereof may be easily stack and unified to said thermosetting foam viscoelasticity layer. As said restricted layer, concretely, a glass cloth; a carbon fiber; an organic series nonwoven fabric manufactured by a synthetic resin fiber; a metallic foil manufactured by aluminum, steel or alloys etc of various metals; and so on may be shown as examples.

The glass cloth and the metallic foil manufactured by aluminum are especially desirable when the price, the weight, the performance of sticking and the intensity are took into consideration, among the above. Said glass cloth etc. may be used at least one kind of above-mentioned examples.

The thermosetting foam viscoelasticity layer in the present invention comprising (a) the rubber having the number average molecular weight of from 500 to 20000, (b) the thermal plasticity elastomer, (c) the tackifier comprising the terpene system resin, the aliphatic series system petroleum resin and the aromatic series system petroleum resin, (d) the foaming agent, (e) the inorganic filler, (f) the softening agent, and (g) the cross-linking agent.

It is preferred to admix these components in altogether 100% by weight, as following mentioned, including the case that the fiber is admixed and the liquid rubber is replaced the partial of the rubber having the number average molecular weight of from 500 to 20000, also, including the case that the softening agent is admixed in response to need.

As (a) the rubber having the number average molecular weight of from 500 to 20000 for use in the thermosetting foamed viscoelasticity layer, conjugated diene system polymers such as polybutadiene rubber, 1,2-polybutadiene rubber, styrene-butadien rubber, acrylonitrile-butadiene rubber, poly isoprene rubber, chloroprene rubber, isobutylene-isoprene rubber etc. can be recited as examples. Specially, the rubber having functional group of —OH, —COOH, —NH$_2$, —NCO, —CH=CH$_2$ etc. can be recited as examples. Especially, polybutadiene rubber, styrene-butadiene rubber and isobutylene-isoprene rubber can be recommended.

The number average molecular weight of thereof is from 500 to 20000, preferably from 1000 to 10000. If the number average molecular weight of thereof is less than 500, it is feared that the tack strength to the steel plate will deteriorate, whereas if it is exceeding 20000, it is feared that the performance of flattery of form (configuration flattery nature) will deteriorate.

The amount of said rubber is from 5 to 30% by weight, preferably from 7 to 15% by weight. If the amount of the rubber component is less than 5%, the tackiness and the performance of flattery of form deteriorates. If it is exceeding 30% by weight, the viscosity of the constituent before bridge formation become low, and the tack strength to the steel plate deteriorates.

In the present invention, when part of (a) the rubber having the number average molecular weight of from 500 to 20000 for use in the thermosetting foam viscoelasticity layer is replaced with the other liquid rubber, it is found that the storage stability can be improve, even after preservation of proper period, excellent performance of impact resistance can be obtained.

As said liquid rubber, for example, liquid butadiene denatured rubber of molecular weight 45000 may be shown as examples.

Said liquid rubber is able to replace from 5 to 50% by weight of the rubber having the number average molecular weight of from 500 to 20000. If the amount of the liquid rubber is less than 5% by weight, the performance of impact resistance by improvement of the storage stability become not sufficient, if it is exceeding 50% by weight, said effect become saturate and is not economical.

As the thermal plasticity elastomer of (b) component for use in the thermosetting foam viscoelasticity layer, 1,2-polybutadiene: an ethylene-vinylacetate copolymer; the copolymer of an aromatic series vinyl compound and a conjugated diene compound; and these hydrogenated compound, ionomer, or carboxy denaturation object of polyolefine etc. can be recited as examples.

The combination which above-mentioned thermal plasticity elastomer take together an epoxy resin or polyisocyanate etc. may be applied.

In the above-mentioned examples, 1,2-polybutadiene, the copolymer of the aromatic series vinyl compound and the conjugated diene compound, particularly, block copolymer of thereof, the acid denaturation object of polyolefine of thereof and these combined the epoxy resin or polyisocyanate are desirable.

As 1,2-polybutadiene, 1,2-polybutadiene which the content by amount of 1,2 bond is more than 70%, preferably more than 85% is desirable. That crystallinity is more than 5%, preferably more than from 10 to 40% is able to recommend.

As molecular weight, it is desirable that the coefficient of viscosity [η] (Toluene at: 30° C.) is not less than 0.5 dl/gr in order to acquire kneading workability and cross-linking formation fizz.

The blend amount of said thermal plasticity elastomer of (b) component is from 5 to 30% by weight, preferably from 7 to 15% by weight.

If the amount of the thermal plasticity elastomer of (b) component is less than 5% by weight, the tackiness and the performance of flattery of form deteriorates, if it is exceeding 30% by weight, the viscosity of the constituent before bridge formation become low, and the tack strength to the steel plate deteriorates.

As the tackifiers of (C) component for use in the thermosetting foam viscoelasticity layer, terpene system resin, aliphatic and aromatic series system petroleum resins, rosin resin and cumarone-indene resin can be shown as examples.

If said tackifier is one kind, example, if said tackifier is only said aliphatic series system petroleum resin only, the initial baking performance is good to the rear section such as the ceiling etc., however, as shown in later test result of the performance of impact resistance, when the impact from outer side was added, the appearance of the float part and the peel part are occurred, fully function of reinforcement and vibration-damping can not be shown, also, after preservation of proper period, the performance of impact resistance deteriorates.

It is desirable that the blend amount of said tackifiers is from 10 to 25% by weight. If the amount of the tackifiers is less than 10% by weight, the tackiness to the steel plate deteriorates, if it is exceeding 25% by weight, the adhesion reinforcement deteriorates.

As above mentioned, in the present invention, the tackifiers comprised the thermosetting foamed viscoelasticity layer are used the tackifiers comprised said terpene system resin, said aliphatic series system petroleum resin and said aromatic series system petroleum resin, also, the fiber was added to said thermosetting foamed viscoelasticity layer.

As above mentioned, if said tackifier is one kind, example, if said tackifier is only an aliphatic series system petroleum resin, the initial baking performance is good to the rear section such as the ceiling etc., however, as shown in later test result of the performance of impact resistance, when an impact from outer side is added, the appearance of the float part and the peel part occurs, fully function of reinforcement and vibration-damping can not be shown, also, after preservation of proper period, the performance of impact resistance deteriorates.

Moreover, it is not only one kind, but also said tackifier comprising said terpene system resin, said aliphatic series system petroleum resin and said aromatic series system petroleum resin was used, equally, the initial baking performance is good to the rear section such as the ceiling etc., however, as shown in later test result of the performance of impact resistance, when the impact from outer side was added, the appearance of the float part and the peel part are occurred, fully function of reinforcement and vibration-damping can not be shown, also, after preservation of proper period, the performance of impact resistance deteriorates.

However, now, when the fiber was added, it was found that the performance of impact resistance can be raised, even if the pigment having high aspect ratio such as mica and special denatured asphalt was added, the initial baking performance is good to the rear section such as the ceiling etc., even if the impact from outer side was added, the appearance of the float part and the peel part didn't occur, fully function of reinforcement and vibration-damping can be shown, also, after preservation of proper period, the performance of impact resistance didn't deteriorate.

As the examples of said fiber (the fibrous material), the polyester system fiber and the glass fiber can be shown. The combination of fibers comprising the polyester series fiber and the glass fiber is superior in order to raise above-mentioned effect.

It is desirable that the blend amount of said fiber is from 1 to 10% by weight. If the amount of the fiber is less than 1% by weight, the performance of impact resistance become not sufficient, if it is exceeding 10% by weight, said effect become saturate and it is not economical.

As the foaming agent of (d) component for use in the thermosetting foam viscoelasticity layer, well-known inorganic or organic foaming agent can be used.

The examples thereof are as follows.
Sodium Bicarbonate;
Ammonium carbonate;
Azodicarbonamide;
Dinitrosopentamethylenetetramine;
Dinitrosoterephthalamide;
Azobisisobutyronitrile;
Azodicarboxylic acid barium;

Sulfonylhydrazide;
Toluene sulfonylhydrazide etc.

Said foaming agent can be used together with a foaming assistant such as urea and urea derivative etc.

Among the above, the using of only or together of azodicarbonamide and dinitrosopentamethylenetetramine, or the using of compound composed of these and said foaming assistant such as urea and urea derivative etc. is preferable.

The blend amount of said (d) component is from 1 to 10% by weight, preferably from 4 to 7% by weight. If the amount of the (d) component is less than 1% by weight, the desired foaming effectiveness cannot obtain, if it is exceeding 10% by weight, a good appearance cannot obtain in order to generates the gas from the foaming agent.

As said foaming agent, the using of above-mentioned organic foaming agent together with a heat expansibility microcapsule which wrapped hydrocarbon having low boiling point in a shell of a thermal plastic may be recommended. According to said together-using, the adiabatic efficiency of the ceiling etc. can be raised.

The ratio of said organic foaming agent use together with the heat expansibility microcapsule is preferably the organic foaming agent: the heat expansibility microcapsule=1:1-2, when deviates from said ratio of said together-using, said adiabatic efficiency become decrease.

As the inorganic filler of (e) component for use in the thermosetting foam viscoelasticity layer, calcium carbonate, barium sulfate, magnesium hydroxide, mica, talc, clay, silicic acid, a pigments or the like such as titanium oxide and carbon black etc., and fibrous filler such as carbon fiber and cotton flocks etc. can be used as examples.

In the present invention, at the thermosetting foamed viscoelasticity layer, hence, it is not only using of the tackifiers comprising said terpene system resin, said aliphatic series system petroleum resin and said aromatic series system petroleum resin, but also using of adding of the fiber, when even if the pigment or the like such as mica and carbon black etc. was added as the filler, it was found that the performance of impact resistance can be raised. It is desirable that the blend amount of said inorganic filler is from 10 to 60% by weight, preferably from 10 to 40% by weight. If the amount of the inorganic filler is less than 10% by weight, the performance of kneading become not sufficient, and the disadvantages on the cost front in order to rise in prices of the whole bring out. If it is exceeding 60% by weight, the performance of viscoelasticity and the intensity deteriorates.

As the softening agent of (f) component for use in the thermosetting foam viscoelasticity layer, generally, the softening agent for rubber of mineral oil system called process oil or extender oil can be recited as examples. The softening agent of naphthene system and aromatic series system are desirable for reason of compatibility against above-mentioned the other components. Further, atactic polypropylene and bituminous substance such as asphalt can be shown as examples.

It is desirable that the blend amount of said (f) component is from 0 to 20.0% by weight, preferably from 1.0 to 15.0% by weight. If the amount of said (f) component is exceeding 20.0% by weight, the performance of working of kneading deteriorates.

In the present invention, even if when a denatured asphalt is added, the performance of impact resistance after baking of the rear section can be raised.

As the cross-linking agent of (g) component for use in the thermosetting foam viscoelasticity layer, the following examples can be recited.

Sulfur; the combination of sulfur or a compound which generates sulfur by heating with cross linking accelerator; organic peroxide; isocyanate compound; amine system compound.

A method of cross linking can be used too the process of cross linking by ultraviolet rays, electron ray and X-ray etc.

As said sulfur, general sulfur such as powder sulfur and colloid sulfur etc. can be used. As said compound which generates sulfur by heating, tetramethyl thiraum disulfide, tetraethyl thiraum disulfide can be shown as examples.

It is desirable that the blend amount of said (g) component is from 1 to 10% by weight, preferably from 3 to 8% by weight. If the amount of said (g) component is less than 1% by weight, the performance of reinforcement cannot obtain for reason that the degree of cross linking become not sufficient, if it is exceeding 10% by weight, become brittle, the utility become fall behind.

Said thermosetting foam viscoelasticity layer is able to manufactured by dispersing-kneading of above-mentioned various each compounds with the use of conventionally well-known mixed dispersers such as a dissolver, a banbury mixer, an open kneader and a vacuum kneader etc., after, by manufacturing in a sheet-form with the use of processing machinery such as a calendering roll and an extrusion molding machine etc.

Said steel plate-reinforcing material of a type giving vibration-damping performance to the steel plate is able to manufactured by sticking-pressure-unifying between the restricted layer and the thermosetting foam viscoelasticity layer. Said steel plate-reinforcing material of the type giving vibration-damping performance to the steel plate is useful for various field of a production machinery, a transport machinery and an industrial machine, for example, in the automobile field, according to the construction parts of the automobile, it carries out punching-manufacturing by conventionally well-known processing machine such as a press machine etc., after, mainly, it may be used on the occasion when an attachment working in one's post called "Body Shop" of the automobile manufactures factory.

EXAMPLE

For better understanding of the present invention, examples will be described below. Needless to say, the present invention is not limited by the following examples.

Example 1

1) As the restricted layer, the glass cloth having a thickness of 0.2 mm.
2) As the thermosetting foam viscoelasticity layer, as follows, the mixed-total-amount become 100 parts by weight in all so,
the rubber (polybutadiene system) having the number average molecular weight of 2000 12 parts by weight,
the thermal plasticity elastomer (polybutadiene system) 14 parts by weight, the filler (calcium carbonate etc.) 23 parts by weight,
the softening material (paraffin or naphthene system oil, etc.) 3 parts by weight,
the cross-linking agent (sulfur) 4.5 parts by weight,
a cross-linking accelerator 2.5 parts by weight,
the foaming agent 2 parts by weight,
the foaming assistant 2 parts by weight,
the carbon black 1 parts by weight,
the pigment having high aspect ratio (the mica etc.) 10 parts by weight,
the special denatured asphalt 5 parts by weight, the aliphatic series system petroleum resin (melting point: 100° C.) 10 parts by weight,
the aromatic series system petroleum resin (melting point: 90° C.) 5 parts by weight,
the terpene system resin (melting point: 85° C.) 5 parts by weight, the polyester system cut-fiber 1 parts by weight,
above-mentioned various compounds are mixed and kneaded by pressure type kneader, after, the sheet having the thickness of 1.8 mm are made by calendaring.

These above-mentioned 1) the restricted layer and 2) the thermosetting foam viscoelasticity layer are sticked and pressure-unified, a sample (a vibration-damping reinforcement sheet 1) having a release paper on one side thereof is made, this release paper is released form this sample, and this sample is offered to after-mentioned each test.

Example 2

1) As the restricted layer, the glass cloth having the thickness of 0.2 mm.
2) As the thermosetting foam viscoelasticity layer, as follows, the mixed-total-amount become 100 parts by weight in all so,
the rubber (polybutadiene system) having the number average molecular weight of 2000 7 parts by weight,
the thermal plasticity elastomer (polybutadiene system) 13 parts by weight, the filler (calcium carbonate etc.) 23 parts by weight,
the softening agent (paraffin or naphthene system oil etc.) 3 parts by weight,
the cross-linking agent (sulfur) 5 parts by weight,
the cross-linking accelerator 3 parts by weight,
the foaming agent 2 parts by weight,
the foaming assistant 2 parts by weight,
the carbon black 1 parts by weight,
the pigment having high aspect ratio (the mica etc.) 10 parts by weight,
the special denatured asphalt 5 parts by weight,
the aliphatic series system petroleum resin (melting point: 100° C.) 10 parts by weight,
the aromatic series system petroleum resin (melting point: 90° C.) 5 parts by weight,
the terpene system resin (melting point: 85° C.) 5 parts by weight,
the polyester system cut-fiber 1 parts by weight,
the liquid butadiene denatured rubber of molecular weight 45000 5 parts by weight,
above-mentioned various compounds are mixed and kneaded by pressure type kneader, after, the sheet having the thickness of 1.8 mm is made by calendaring.
These above-mentioned 1) the restricted layer and 2) the thermosetting foam viscoelasticity layer are sticked and pressure-unified, a sample (a vibration-damping reinforcement sheet 2) having a release paper on one side thereof is made, this release paper is released form this sample, and this sample is offered to after-mentioned each test.

Example 3

1) As the restricted layer, the metallic foil manufactured by aluminum of the thickness of 100μ is used as a substitute for the glass cloth having the thickness of 0.2 mm,
2) As the thermosetting foam viscoelasticity layer, as follows, the mixed-total-amount become 100 parts by weight in all so,
the rubber (polybutadiene system) having the number average molecular weight of 2000 7 parts by weight,
the thermal plasticity elastomer (polybutadiene system) 13 parts by weight,
the filler (calcium carbonate etc.) 23 parts by weight,
the softening agent (paraffin or naphthene system oil etc.) 3 parts by weight,
the cross-linking agent (sulfur) 5 parts by weight,
a cross-linking accelerator 3 parts by weight,
the foaming agent 2 parts by weight,
the foaming assistant 2 parts by weight,
the carbon black 1 parts by weight,
the pigment having high aspect ratio (the mica etc.) 10 parts by weight,
the special denatured asphalt 5 parts by weight,
the aliphatic series system petroleum resin (melting point: 100° C.) 10 parts by weight,
the aromatic series system petroleum resin (melting point: 90° C.) 5 parts by weight,
the terpene system resin (melting point: 85° C.) 5 parts by weight, the polyester system cut-fiber 1 parts by weight,
the liquid butadiene denatured rubber of molecular weight 45000 5 parts by weight,
above-mentioned various compounds are mixed and kneaded by pressure type kneader, after, the sheet having the thickness of 1.8 mm is made by calendaring.

These above-mentioned 1) the restricted layer and 2) the thermosetting foam viscoelasticity layer are sticked and pressure-unified, a sample (a vibration-damping reinforcement sheet 2) having the release paper on one side thereof is made, this release paper is released form this sample, and this sample is offered to after-mentioned each test.

Comparative Example 1

1) As the restricted layer, the glass cloth having the thickness of 0.2 mm.
2) As the thermosetting foam viscoelasticity layer, as follows, the mixed-total-amount become 100 parts by weight in all so,
the rubber (polybutadiene system) having the number average molecular weight of 2000 12 parts by weight,
the thermal plasticity elastomer (polybutadiene system) 19 parts by weight,
the filler (calcium carbonate etc.) 34 parts by weight,
the softening agent (paraffin or naphthene system oil etc.) 3 parts by weight,
the cross-linking agent (sulfur) 4.5 parts by weight,
a cross-linking accelerator 2.5 parts by weight,
the foaming agent 2 parts by weight,
the foaming assistant 2 parts by weight,
the carbon black 1 parts by weight,
the aliphatic series system petroleum resin (melting point: 100° C.) 20 parts by weight,
above-mentioned various compounds are mixed and kneaded by pressure type kneader, after, the sheet having the thickness of 1.8 mm is made by calendaring.
These above-mentioned 1) the restricted layer and 2) the thermosetting foam viscoelasticity layer are sticked and pressure-unified, a sample (a vibration-damping reinforcement sheet 3) having a release paper on one side thereof is made, this release paper is released form this sample, and this sample is offered to after-mentioned each test.

Comparative Example 2

1) As the restricted layer, the glass cloth having the thickness of 0.2 mm.
2) As the thermosetting foam viscoelasticity layer, as follows, the mixed-total-amount become 100 parts by weight in all so,
the rubber (polybutadiene system) having the number average molecular weight of 2000 12 parts by weight, the thermal plasticity elastomer (polybutadiene system) 14 parts by weight,
the filler (calcium carbonate etc.) 24 parts by weight,
the softening agent (paraffin or naphthene system oil etc.) 3 parts by weight,
the cross-linking agent (sulfur) 4.5 parts by weight,
a cross-linking accelerator 2.5 parts by weight,
the foaming agent 2 parts by weight,
the foaming assistant 2 parts by weight,
the carbon black 1 parts by weight,
the pigment having high aspect ratio (the mica etc.) 10 parts by weight,
the special denatured asphalt 5 parts by weight,
the aliphatic series system petroleum resin (melting point: 100° C.) 20 parts by weight,
above-mentioned various compounds are mixed and kneaded by pressure type kneader, after, the sheet having the thickness of 1.8 mm is made by calendaring.

These above-mentioned 1) the restricted layer and 2) the thermosetting foam viscoelasticity layer are sticked and pressure-unified, a sample (a vibration-damping reinforcement sheet 4) having the release paper on one side thereof is made, this release paper is released form this sample, and this sample is offered to after-mentioned each test.

Comparative Example 3

1) As the restricted layer, the glass cloth having the thickness of 0.2 mm.
2) As the thermosetting foam viscoelasticity layer, as follows, the mixed-total-amount become 100 parts by weight in all so,
the rubber (polybutadiene system) having the number average molecular weight of 2000 12 parts by weight,
the thermal plasticity elastomer (polybutadiene system) 14 parts by weight,
the filler (calcium carbonate etc.) 24 parts by weight,
the softening agent (paraffin or naphthene system oil etc.) 3 parts by weight,
the cross-linking agent (sulfur) 4.5 parts by weight,
the cross-linking accelerator 2.5 parts by weight,
the foaming agent 2 parts by weight,
the foaming assistant 2 parts by weight,
the carbon black 1 parts by weight,
the pigment having high aspect ratio (the mica etc.) 10 parts by weight,
the special denatured asphalt 5 parts by weight,
the aliphatic series system petroleum resin (melting point: 100° C.) 10 parts by weight,
the aromatic series system petroleum resin (melting point: 90° C.) 5 parts by weight,
the terpene system resin (melting point: 85° C.) 5 parts by weight,
above-mentioned various compounds are mixed and kneaded by pressure type kneader, after, the sheet having the thickness of 1.8 mm is made by calendaring.

These above-mentioned 1) the restricted layer and 2) the thermosetting foam viscoelasticity layer are stucked and pressure-unified, a sample (a vibration-damping reinforcement sheet 5) having the release-paper on one side thereof is made, this release-paper is released form this sample, and this sample is offered to after-mentioned each test.

Test Method (1) The Performance of Reinforcement

A sample of 150×25 mm was stuck on the center of the test steel plate of 150×25×0.8 mm (SPCC-SD steel plate), and was performed baking for 30 minutes in the inside of a thermal-wind-drying-machine controlled at 150 plus minus 2° C., a test piece was made by leave cooling down till a normal temperature. Next, the temperature of said test piece was adjusted 20 plus minus 2° C., after, a bend-test was performed as shown in FIG. 1, a load (N) when the test piece was displaced 1 mm was measured. Further, the speed of cross head was 1 mm/minutes.

(2) The Performance of Baking to the Rear Section

A sample was cut in the size of 50×100 mm, and was putted on the center of the test steel plate (200×300×0.8 mm), after, was stuck for 5 second minutes under the condition which a pressure of 5.9 KPa puts on the all section of a vibration-damping reinforcement sheet.

Next, above-mentioned steel plate was allowed for 24 hours under the condition which said sample was rear face, and said steel plate was baked 150° C.×30 plus minus 2 minutes, after, the condition of said sample was confirmed.

(3) The Performance of Impact Resistance

The test piece carried out baking in above-mentioned (2) was allowed to cool down to a temperature 20° C., said test piece was connected with a slamming-test-machine as shown FIG. 2, the impact was given to the test piece from an angle of 70 degrees. If the test piece dose not occur the peeling, the floating or the aberration, etc., the impact was given to the test piece till 10 times in same angle. During this time, in the test piece, if there was nothing wrong, the 10 angle raises up in their angle, same test was carried out repeatedly in same test piece. The impact angle and the number of times was confirmed when any the peeling, the floating or the aberration was occurred.

(4) The Performance of Vibration-Damping

With the resonance method (refer to Acoustical Materials Association of JAPAN publication "Noise Cure Handbook" 438 pages), the loss-factor η in each temperature of 20° C., 40° C., and 60° C. was measured. In addition, it is judged that the more the value of the loss-factor η was large, the more the performance of vibration-damping was high, and it has the performance of vibration-damping when if they are 0.05 or more values.

The results of test are shown in Table 1.

TABLE 1

| component | Example 1 | Example 2 | Example 3 | Comparative Example 1 | Comparative Example 2 | Comparative Example 3 |
|---|---|---|---|---|---|---|
| Rubber (polybutadiene system) of molecular weight 2000 | 12 | 7 | 7 | 12 | 12 | 12 |
| Thermal plasticity elastomer (polybutadiene system) | 14 | 13 | 13 | 19 | 14 | 14 |
| Filler (calcium carbonate etc.) | 23 | 23 | 23 | 34 | 24 | 24 |
| Softening agent (paraffin or naphthene system oil etc.) | 3 | 3 | 3 | 3 | 3 | 3 |

TABLE 1-continued

| component | | Example 1 | Example 2 | Example 3 | Comparative Example 1 | Comparative Example 2 | Comparative Example 3 |
|---|---|---|---|---|---|---|---|
| Cross-linking agent (sulfur) | | 4.5 | 5 | 5 | 4.5 | 4.5 | 4.5 |
| Cross linking accelerator | | 2.5 | 3 | 3 | 2.5 | 2.5 | 2.5 |
| Foaming agent | | 2 | 2 | 2 | 2 | 2 | 2 |
| Foaming assistant | | 2 | 2 | 2 | 2 | 2 | 2 |
| Carbon black | | 1 | 1 | 1 | 1 | 1 | 1 |
| Pigment having high aspect ratio (mica etc.) | | 10 | 10 | 10 | | 10 | 10 |
| Special denatured asphalt | | 5 | 5 | 5 | | 5 | 5 |
| Aliphatic series system petroleum resin melting point: 100° C. | | 10 | 10 | 10 | 20 | 20 | 10 |
| Aromatic series system petroleum resin melting point: 90° C. | | 5 | 5 | 5 | | | 5 |
| Terpene resin melting point: 85° C. | | 5 | 5 | 5 | | | 5 |
| Polyester series cut-fiber | | 1 | 1 | 1 | | | |
| Rubber (polybutadiene denatured) of molecular weight 4500 | | | 5 | 5 | | | |
| Total | | 100 | 100 | 100 | 100 | 100 | 100 |
| Performance of reinforcement (N) 1 mm displaced value(20° C.) | | 37 | 36 | 35 | 40 | 36 | 37 |
| Performance of vibration-deadening (η) Cantilever Beam Method Base 0.8.mm | 20° C. | 0.1 | 0.1 | 0.08 | 0.05 | 0.08 | 0.1 |
| | 40° C. | 0.12 | 0.12 | 0.09 | 0.06 | 0.09 | 0.12 |
| | 60° C. | 0.1 | 0.1 | 0.12 | 0.075 | 0.09 | 0.1 |
| Performance of baking for the rear section | initial | good | good | good | good | good | good |
| | 35° C. × 85% RH preservation after 30 days | good | good | good | good | float part founded | float part founded |
| Performance of impact resistance (after baking for the rear section) aim: 80 angle × not less than 1 time | initial | 90 angle × 10 times< | 90 angle × 10 times< | 90 angle × 10 times< | 80 angle × 5 times | 80 angle × 2 times | 70 angle × 9 times |
| | 35° C. × 85% RH preservation after 30 days | 80 angle × 1 time | 90 angle × 10 times< | 90 angle × 10 times< | 70 angle × 7 times | 70 angle × 3 times | 70 angle × 2 times |
| Restricted layer | | The glass cloth | The glass cloth | Aluminum foil 100μ | The glass cloth | The glass cloth | The glass cloth |

Result

The vibration-damping reinforcement sheet 3-5 of Comparative Example 1-3 has not problems regarding with the initial baking performance to the rear section, as shown in described above test result of the performance of impact resistance, when the impact from the outside was added, the appearance of the float part and the peel part are occurred, fully function of reinforcement and vibration-damping can not be shown. Particularly, after the preservation of 1 month under 35° C.×85% humidity, it was caused the result that the performance of impact resistance became still more deteriorate.

As shown in Example 1, it can be seen that the performance of impact resistance was raised up largely when the polyester system cut-fiber was added.

As shown in Example 2, when the parts of the liquid polybutadiene having the number average molecular weight of 2000 was replaced the liquid rubber (polybutadiene denatured) having the number average molecular weight of 45000, it can be seen that the storage stability can be improved, even after the preservation of 1 month (30 days) under 35° C.×85% humidity (RH), it is found that largely excellent performance of impact resistance can be obtained.

INDUSTRIAL APPLICABILITY

The present invention can be applied to the all of vehicles besides the automobile.

EXPLANATION OF REFERENCE

Figure 1:
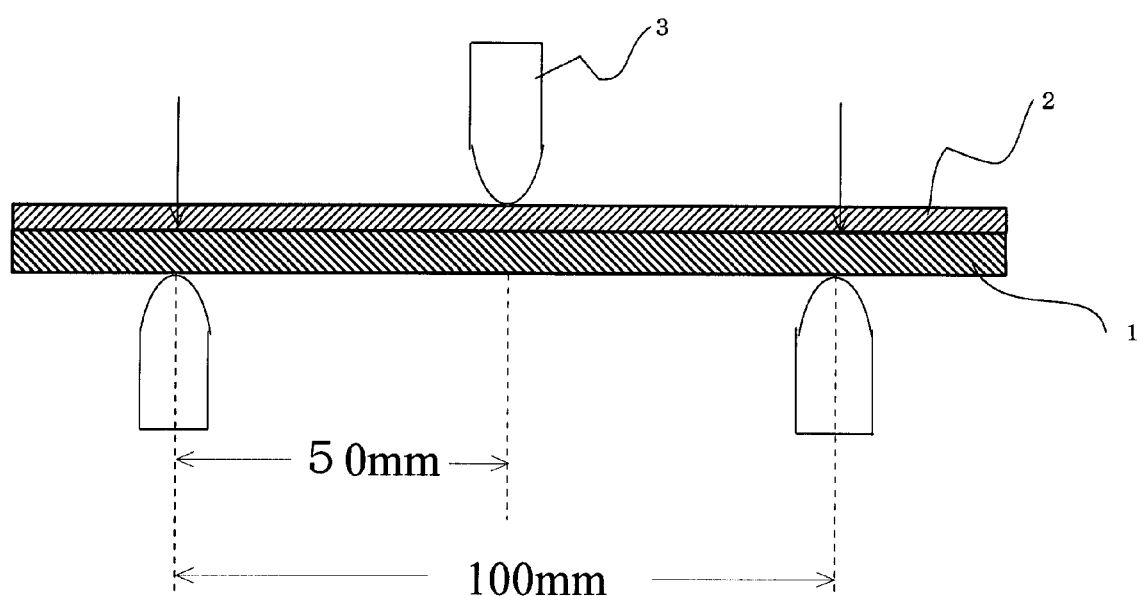
FIG. 1 It is an explanatory Figures of test method (the performance of reinforcement) in Examples of the present invention.
Figure 2:
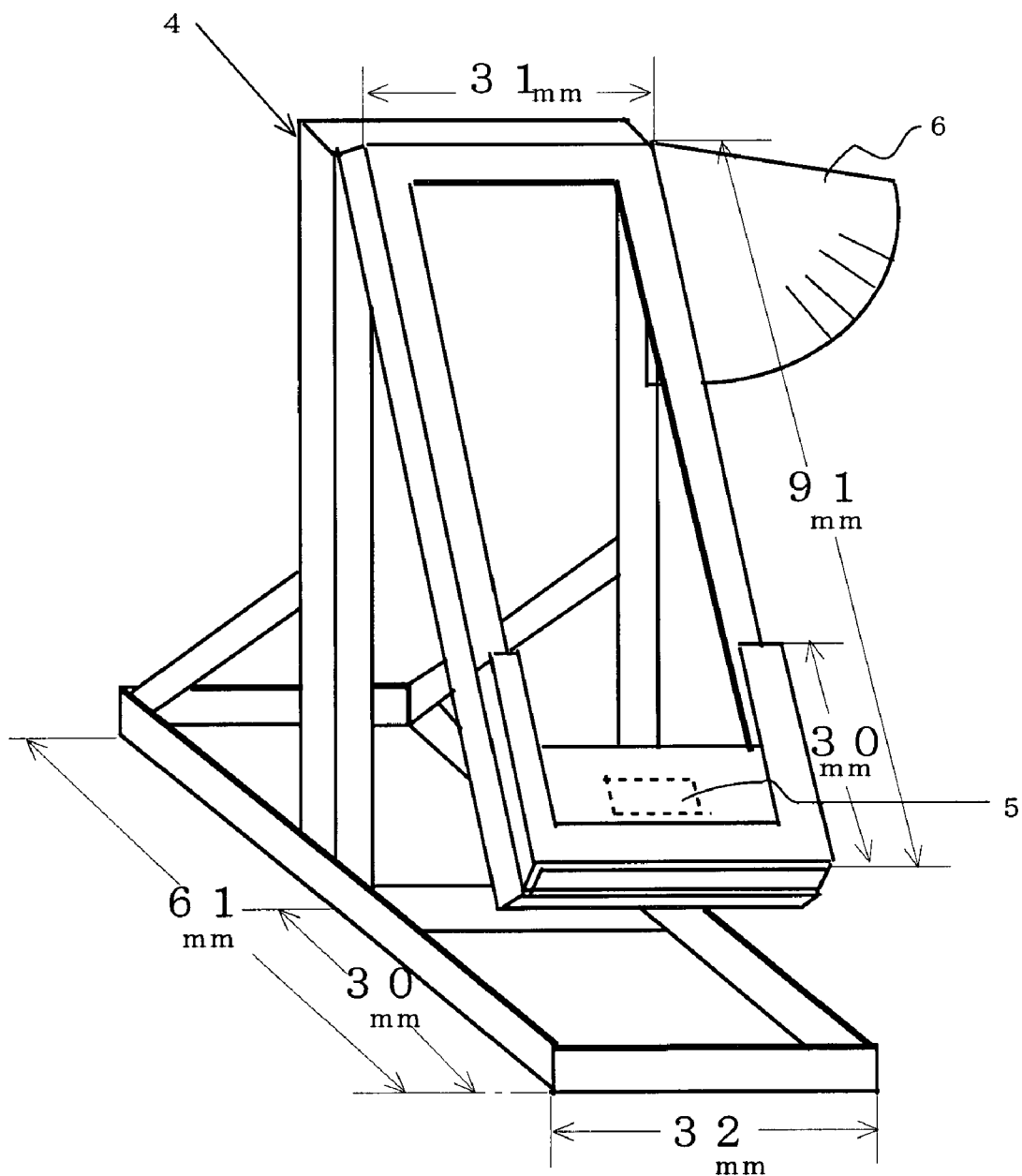
FIG. 2 It is an explanatory Figures of test method (the performance of impact resistance) in Examples of the present invention.

1 The sample
2 The steel plate for test
3 The load
4 The slamming test machine
5 The test piece
6 A indicate board of an angle

The invention claimed is:
1. A steel plate-reinforcing material for giving vibration-damping performance to a steel plate comprising a restricted layer and a thermosetting foamed viscoelasticity layer, the thermosetting foamed viscoelasticity layer comprises tackifiers, a fiber and an inorganic filler wherein the tackifiers include a terpene resin, an aliphatic petroleum resin and an aromatic petroleum resin, and wherein the fiber is selected from the group consisting of a polyester fiber and a combination of polyester fiber and glass fiber;
   an amount of said fiber is from 1 to 10% by weight;
   and wherein the steel plate-reinforcing material has an impact resistance after preservation for 30 days at 35° C. and 85% Relative Humidity, such that no peeling, floating or aberration occurs when the material is subjected to impact from 30 mm distance at an 80° angle or greater for 1 time.
2. The material according to claim 1, wherein said thermosetting foamed viscoelasticity layer consists essentially of:

(a) a rubber having number average molecular weight of 500 to 20000,
(b) a thermal plasticity elastomer;
(c) said tackifiers comprising the terpene resin, the aliphatic petroleum resin and the aromatic petroleum resin,
(d) a foaming agent,
(e) the inorganic filler,
(f) a softening agent,
(g) a cross-linking agent, and
(h) the fiber selected from the group consisting of the polyester fiber and the combination of polyester fiber and glass fiber.

3. The material according to claim 2, wherein (a) said rubber having number average molecular weight of 500 to 20000 in said thermosetting foamed viscoelasticity layer is replaced by a different liquid rubber or rubbers.

4. The material according to claim 1, wherein said material is incorporated in a ceiling of a vehicle.

5. The material according to claim 1, wherein said material is incorporated in a vehicle after an electrodeposition process is performed on said vehicle.

* * * * *